July 14, 1953     D. E. JONES     2,645,019
COMBINATION LINEAR SCALE
Filed Feb. 24, 1950     2 Sheets-Sheet 1
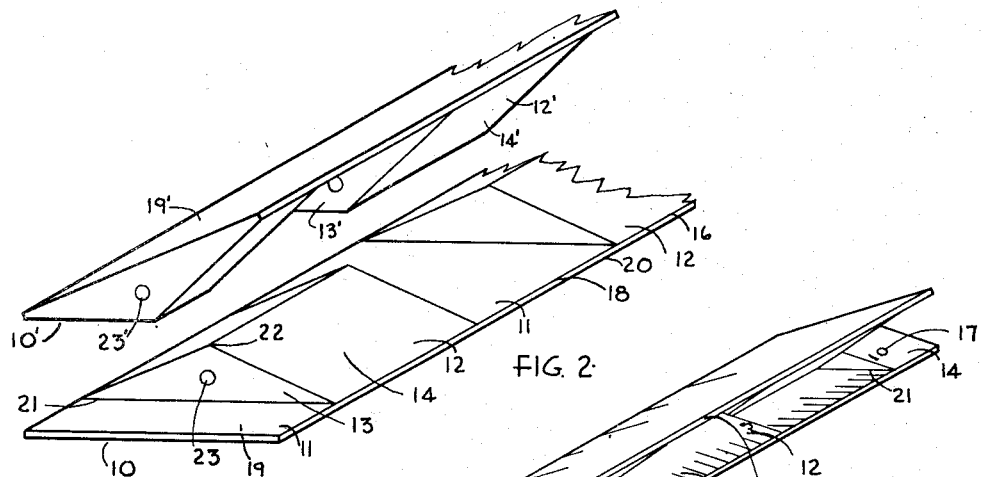
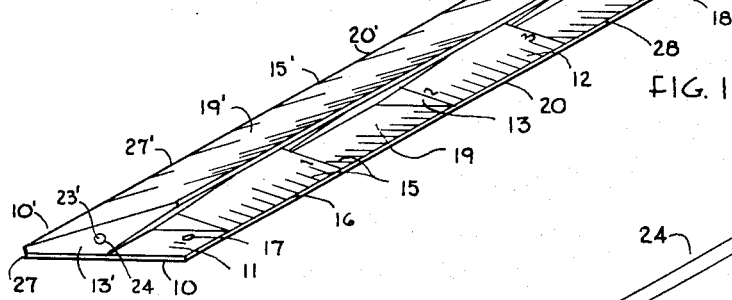
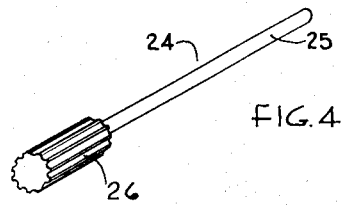
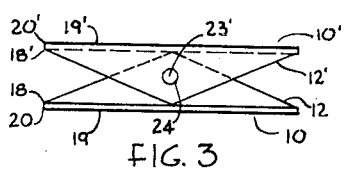
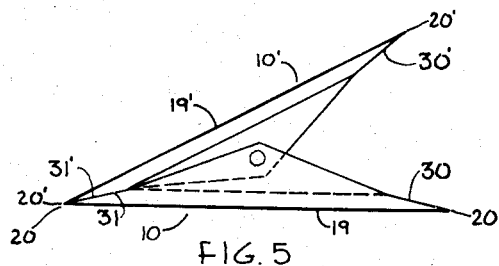
INVENTOR.
David E. Jones
BY Philip M. Dunson
ATTORNEY July 14, 1953 D. E. JONES 2,645,019
COMBINATION LINEAR SCALE
Filed Feb. 24, 1950 2 Sheets-Sheet 2

INVENTOR.
David E. Jones
BY *Philip M. Dimson*
ATTORNEY

Patented July 14, 1953

2,645,019

UNITED STATES PATENT OFFICE 2,645,019

COMBINATION LINEAR SCALE

David E. Jones, Columbus, Ohio

Application February 24, 1950, Serial No. 146,108

20 Claims. (Cl. 33—107)

This invention relates to improvements in linear measuring scales, also called rulers, and more particularly to rulers providing a plurality of scales in the same instrument.

Architects, engineers, and draftsmen use rulers having several kinds of scales, and one object of this invention is to provide a combination linear scale in which the different individual scales generally used are united in a convenient manner.

Another object is to combine in one instrument a plurality of scales that may comprise more than one type of scale, say architects' scales and engineers' scales.

Another object of the invention is to provide a ruler comprising two members pivotably or hingedly connected to provide access to all of the scales on the edges of each member in the one combination instrument.

A further object is to provide two members substantially triangular in cross section having scale graduations on both sides of their base edges and connected along or near the apex of each substantially triangular cross section so as to be pivotable about an axis perpendicular to said cross section.

A further object of the invention is to provide a combination ruler that is readily manipulated from one position to another and that can be grasped with one's fingers and lifted from its resting place without the fingers' smudging or even touching the drawing or paper immediately beneath the ruler.

Another general object of the invention is to provide a multiscale ruler that is simple in construction, is easily and inexpensively manufactured, and is small in cross section.

With the above and other objects and advantages in view, the invention consists of features of construction, arrangement, and operation of parts that appear in the specification and are pointed out in the claims.

Referring now to the drawing in which like reference characters identify like parts throughout the several figures:

Figure 1 is a perspective view of a preferred form of scale according to the invention.

Figure 2 is an enlarged perspective view of the ends and adjacent portions of the scale members in Figure 1, separated, or "exploded" to show the manner of interfitting.

Figure 3 is an end view of the same scale.

Figure 4 is an enlarged perspective view of the pivot pin used in the same scale.

Figure 5 is an end view of a scale nearly identical with that shown in Figures 1 through 3, but having extensions on the graduated edges.

Figure 6:
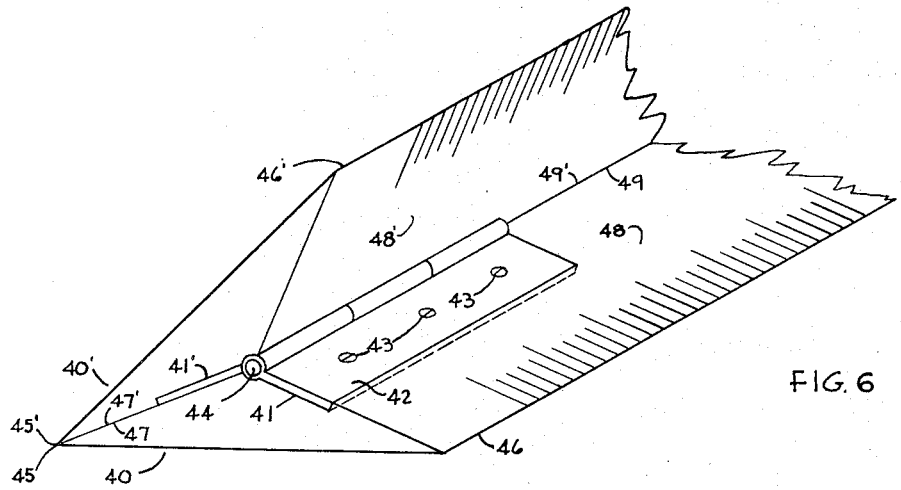
Figure 6 is an enlarged perspective view of an end portion of another preferred form of scale according to the invention.

In a preferred form of combination linear scale according to this invention, scale member 10, Figures 1 through 3, which can be made of any solid type material such as wood, metal, or plastic, comprises a flat base 11 and ridged risers 12. Risers 12 can be glued or otherwise fastened to base 11; or can be integral therewith, the member 10 being formed in a single piece.

Risers 12 are triangular prisms having vertical faces 13 and inclined faces 14. It is convenient to make each riser 12 one inch in length with one-inch spacing between. Scale graduations 15 are marked along both edges 18 of base 11 and along both of the acute-angled edges 16 of risers 12. The vertical faces 13 thereby easily identify the even inch divisions on a full-size scale, and provide convenient locators on other scales related to the inch unit. For a combination of scales in the metric system the centimeter or a whole-numbered multiple thereof would be used as the riser length and spacing length. In any case, however, these two lengths are substantially equal, the riser length being only very slightly less than the spacing length.

The riser 12 on one end of scale member 10 may extend beyond the graduated or scaled portion of the member. It can be made any convenient length and scale designations 17 may conveniently appear on inclined surfaces 14 thereof. On the opposite end of scale member 10 the flat base 11 extends beyond the last riser 12 to a length that preferably is substantially equal to the length of riser 12 on the other end. This portion may extend beyond the graduations or markings, and scale designations 17 may conveniently appear thereon near edges 18.

On the outer or flat side 19 of scale member 10 still other scale graduations 15 are marked along edges 20. Four different scaled edges are thereby provided on scale member 10.

Midway between acute-angled edges 16 of risers 12 and very slightly more than one-half the distance from base 21 to apex 22 of vertical face 13 is provided a small cylindrical hole 23 whose axis is perpendicular to vertical faces 13 (that is, parallel to edges 16, 18, and 20). Hole 23 may be drilled through the risers 12 nearest each end of scale member 10, and may extend into some or all of the intermediately-located risers 12. Used in conjunction with scale member 10 is a similar scale member 10', which is substantially identical in construction to scale member 10 except that the scales marked on member 10' preferably are different from those marked on member 10. Eight different scaled edges, therefore, are provided by the members 10 and 10' combined. One convenient plan for the scales would provide eight architect's scales (two on each edge) on the flat outside faces 19, 19', and four engineer's scales (one on each edge) on the inside faces of bases 11, 11' and inclined faces 14, and 14' of risers 12, 12'. The ruler can be any desired length. The most useful lengths probably are six inches, pocket size, and twelve inches, drafting room size.

Portions of scale member 10' are identified in the drawing by the same reference characters as are used for the similar portions of scale member 10, with primes added to the reference characters where applied to scale member 10'. (One exception may be made to the requirement of identical construction of members 10 and 10'. End risers 12 and 12' need not be equal in length, and end base portions 11 and 11' need not be equal in length, but the length of end riser 12 should equal the length of end base portion 11' and the length of end riser 12' should equal the length of end base portion 11 so that all ends may be flush. Preferably all four of these lengths should be equal, so that the construction of members 10 and 10' may be identical.)

In assembling the combination rule, members 10 and 10' are placed in position with flat faces 19 and 19' facing outward or away from each other, risers 12 fitting between risers 12', end riser 12 fitting proximate to end base portion 11', and riser 12' fitting proximate to end base portion 11, and holes 23 and 23' lined up with their axes coinciding. Pins 24 are inserted, one at each end, into the coaxially-positioned holes 23 and 23'. Inner portion 25 of pin 24 has a slightly smaller diameter than that of holes 23 and 23', providing a loose fit therein. Splined outer portion 26, which is shorter than either end riser 12 or 12', has a slightly larger diameter than that of holes 23 and 23', providing a force fit in hole 23 of end riser 12 and in hole 23' of end riser 12'. Pins 24 are held tight in the end risers 12 and 12' to prevent their falling out, but the loose fit between pins 24 and intermediate risers 12 and 12' provides a pivotable connection between members 10 and 10'.

With the flat side 19 of scale member 10 resting on the drawing paper in use, the two "inner" scales, along edges 18, of scale member 10 can be read and used, as can the "outer" scales, along edges 16', of scale member 10'. Selection among these four scaled edges is effected by pressing straight edge 27' down against straight edge 27 or by pressing straight edge 28' down against straight edge 28 as needed to bring the desired "outer" scale down to the paper or to expose the desired "inner" scale to view.

From the symmetry of the combination scale it is apparent that with the flat side 19' of scale member 10' resting on the paper selection among the other four scaled edges is effected readily in similar manner.

From any position of the combination scale the upper member can be grasped by inserting at least one finger (or the thumb) between the separated edges 18 and 18' on the "high" side and pressing the thumb (or fingers) against the outer face of the upper member. The scale can then be lifted, turned over, or otherwise moved, and the lower member protects the drawing or paper underneath from finger marks or smudges.

The scale can be made to provide greater measuring accuracy by extending outer faces 19 and 19' as shown in Figure 5, thereby providing inclined faces 30 and 30' at one edge of each member and inclined faces 31 and 31' at the opposite edge. Scale graduations are marked on these inclined faces 30, 30', 31, and 31'; and on the edges of outer faces 19 and 19'. All of the scale graduations can extend to their respective edges 20, 20', which are readily placed against the drawing or object on which measurements are to be made, eliminating inaccuracies that might arise from parallax in the scale of Figures 1 through 3. In all other respects this scale is identical to the scale of Figures 1 through 3 and is used in the same manner.

Figure 7:
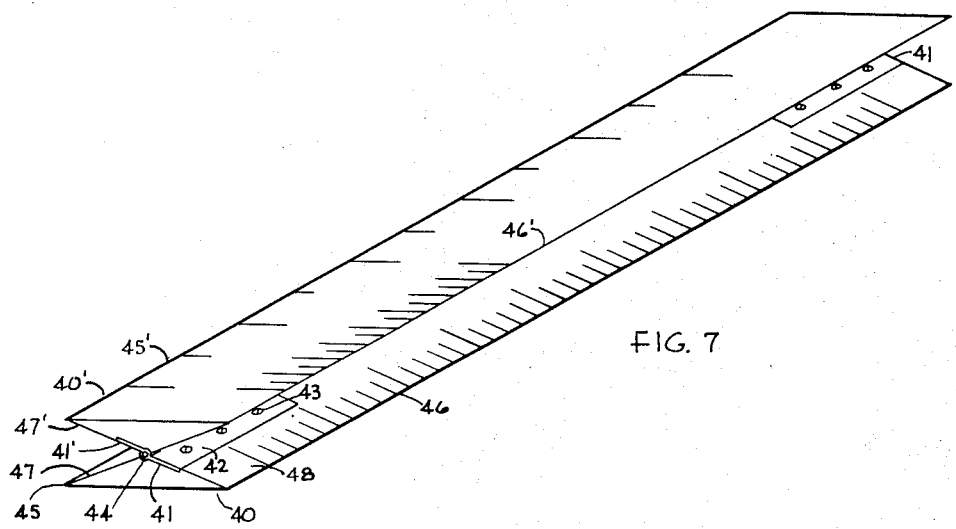
Figure 7 is a perspective view of the entire scale of Figure 6.
Figure 8:
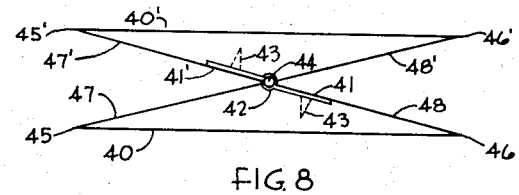
Figure 8 is an end view of the scale of Figures 6 and 7.

In another preferred form of the invention, shown in Figures 6 through 8, each scale member 40, 40' is a triangular prism of uniform cross section except for recessed portions 41, 41' at each end, into which hinges 42 fit. Flathead screws 43 hold hinges 42 to the scale members 40, 40'. The scale members 40, 40' are pivotable about pins 44 on an axis coinciding with the inner, obtuse-angled edge 49, 49' of each scale member. Scales are marked on both faces where they come together at each of the edges 45, 45'; 46, 46', thus providing scale markings that reach to the drawing paper as in the ruler shown in Figure 5.

The inner faces 47, 47' can be pressed together, as shown in Figure 6, with edge 45' coinciding with edge 45. Similarly inner faces 48, 48' can be pressed together to make edge 46' coincide with edge 46. The ruler provides eight graduated face edges, which can readily accommodate as many as sixteen total scales, the same as the other forms of the ruler shown. Manipulation, picking up, and protection against finger marks or smudges on the paper are the same as in the other forms.

While preferred embodiments of the invention have been shown and described, it will be understood that slight changes in form and minor details of construction may be resorted to without departing from the spirit of the invention or falling beyond the scope of the claims.

I claim:

1. A combination linear scale comprising two scale members, each having a flat outer surface, a plurality of flat inner surfaces substantially parallel thereto, and a plurality of ridged risers substantially in the shape of triangular prisms whose triangular faces are perpendicular to said flat surfaces and whose inclined faces are perpendicular to said triangular faces and at an acute angle to said flat surfaces, the opposite edges of said inclined faces lying in the line of the respective longitudinal edges of said flat inner surfaces, all of said edges lying parallel to the longitudinal edges of said flat outer surface, said ridged risers spaced apart along the length of said scale members such that the risers of each scale member register between the risers of the other scale member; a longitudinal opening in the risers of each scale member midway between the longitudinal edges thereof; at least one pivot pin pivotably connecting said scale members through said opening; and linear measuring scales marked on the inner and outer longitudinal edges of each scale member.

2. A combination linear scale assembly comprising two scale members, each having a flat outer surface, a plurality of flat inner surfaces substantially parallel thereto, and a plurality of ridged risers substantially in the shape of triangular right prisms having inclined faces that make an acute angle with said flat surfaces and whose opposite edges lie in the line of the respective longitudinal edges of said flat inner surfaces, all of said edges lying parallel to the longitudinal edges of said flat outer surface, said ridged risers spaced apart longitudinally between said flat inner surfaces such that the risers of each scale member register opposite the flat inner surfaces of the other scale member; a longitudinal opening in the risers of each scale member substantially in the center of the combination scale assembly; a pivot pin connecting said individual scale members through said opening; and linear measuring scale markings on the inner and outer longitudinal edges of each scale member.

3. A combination linear scale comprising two graduated scale members, each having a flat outer surface, a plurality of flat inner surfaces, a plurality of ridged risers longitudinally spaced apart between said flat inner surfaces, the ridged risers of each scale member registering between the ridged risers of the other scale member and pivotably connecting said scale members about a longitudinal axis such that corresponding edges of each scale member will register against those of the other scale member when pressed together.

4. A combination linear scale comprising two graduated scale members, each having a flat outer surface, a plurality of flat inner surfaces, a plurality of ridged risers substantially triangular in cross section and longitudinally spaced apart between said flat inner surfaces, the ridged risers of each scale member registering opposite the flat inner surfaces of the other scale member, and a pivotable connection between said members such that corresponding edges of each scale member can be pressed together to register against each other and to move apart the opposite edges of said scale members.

5. A combination linear scale comprising two graduated scale members, each formed with a plurality of spaced-apart ridged risers substantially triangular in cross section and a single pivotable connection between said members such that either longitudinal edge of either scale member can be pressed against the corresponding edge of the other scale member, providing an opening wide enough for insertion of a finger between the opposite longitudinal edges of said scale members, by virtue of which the upper member can be grasped with the underneath member acting as a shield between the hand of the user and any drawing on which the scale might be used, thereby minimizing accidental finger marks from use of the scale.

6. A combination linear scale comprising two graduated scale members, each formed with a plurality of ridged risers substantially triangular in cross section and spaced apart longitudinally on the inner portion thereof so as to register between the ridged risers of the other scale member, and a pivotable connection through a longitudinal opening in said ridged risers such that either longitudinal edge of either scale member can be pressed against the corresponding edge of the other scale member providing an opening between the opposite longitudinal edges of said scale members, by virtue of which the upper member can be grasped with the underneath member acting as a shield between the hand of the user and any drawing on which the scale might be used, thereby minimizing accidental finger marks from use of the scale.

7. In a combination linear scale, a scale member graduated on both sides of both longitudinal edges and comprising a flat portion and a plurality of intermediate ridged risers substantially triangular in cross section and spaced apart longitudinally at a spacing distance substantially equal to the length of said ridged risers, an end riser of like cross section and spacing but of length independent of said intermediate riser length and spacing, said flat portion extending beyond the farthest intermediate ridged riser a distance substantially equal to the length of said end riser, and a longitudinal opening extending through said intermediate ridged risers and said end riser, whereby a like-shaped scale member in turned-over position can be pivotably connected to said scale member by means of a pivot pin inserted in said opening.

8. In a combination linear scale, a scale member graduated on both sides of both longitudinal edges and comprising a flat outer surface and a flat inner surface portion interspersed with a plurality of ridged risers substantially triangular in cross section and spaced apart longitudinally, a longitudinal opening through said ridged risers through which a pivot pin can be inserted to provide a pivotable connection to a scale member of similar length and width and comprising similar ridged risers having a similar longitudinal opening and constructed such that when said latter scale member is in turned-over position relative to said former scale member to ridged risers of each scale member register between the ridged risers of the other scale member.

9. A combination linear scale comprising two scale members, each bearing graduated scale markings on both sides of both longitudinal edges, each scale member comprising a plurality of ridged risers substantially triangular in cross section and spaced apart longitudinally on the inner portion thereof so as to register between the ridged risers of the other scale member, and a pivotable connection through a longitudinal opening in said ridged risers such that either longitudinal edge of either scale member can be pressed against the corresponding longitudinal edge of the other scale member thereby placing into usable position the outer-face scale markings on the pressed-down edge of the upper scale member and separating the opposite longitudinal edges whereby the inner-face scale markings on said opposite longitudinal edge of the underneath scale member are open to view and in usable position.

10. A combination linear scale comprising two graduated scale members in turned-over relationship, each scale member comprising a flat outer surface and a flat inner portion with a plurality of ridged risers longitudinally spaced apart on said flat inner portion, the ridged risers of each scale member registering between the ridged risers of the other scale member, a longitudinal opening through said ridged risers, and a pin inserted in said opening to provide a pivotable connection between said scale members.

11. A combination linear scale comprising two scale members in turned-over relationship, each scale member comprising a flat outer surface and a flat inner portion with a plurality of ridged risers longitudinally spaced apart on said flat inner portion, the ridged risers of each scale member registering between the ridged risers of the other scale member, a longitudinal opening through said ridged risers, a pin inserted in said opening to provide a pivotable connection between said scale members, and graduated scale markings on both sides of both longitudinal edges of each scale member, providing scales selectable by placing either scale member in underneath position and pressing down on either longitudinal edge of the upper scale member to place said pressed-down scaled edge in usable position and to expose for use the opposite inner scale of the underneath scale member.

12. A combination linear scale comprising two graduated scale members in turned-over relationship, each scale member comprising a flat outer surface and a flat inner portion with a plurality of ridged risers longitudinally spaced apart on said flat inner portion, the ridged risers of each scale member registering between the ridged risers of the other scale member, a longitudinal opening through said ridged risers, and a pivot pin inserted in said opening so that corresponding longitudinal edges of both scale members can be pressed together separating the opposite longitudinal edges whereby said opposite edge on the upper scale member can be grasped for moving the combination scale, with said opposite edge on the lower scale member providing a shield between the hand of the user and any drawing that the combination scale is used on.

13. A combination linear scale comprising two graduated scale members, each comprising a flat portion and a plurality of ridged risers longitudinally spaced apart on said flat portion, the ridged risers of each scale member registering between the ridged risers of the other scale member, a longitudinal opening through said ridged risers, and a pivot pin inserted in said opening.

14. The combination scale of claim 13 and an inclined portion extending from each inner longitudinal edge of said flat portion to an outer longitudinal edge, whereby corresponding outer longitudinal edges of the two scale members can be pressed together to coincide, while spreading apart the opposite corresponding outer longitudinal edges of said scale members.

15. A combination linear scale comprising two scale members, each having a single flat rectangular outer surface identical in size and shape to, and oppositely disposed to, the outer surface of the other scale member; graduated scale markings along both sides of both outer longitudinal edges of each scale member; a pivotable connection between said scale members about a single axis midway between said outer surfaces, parallel to said longitudinal edges, and substantially in the center of said combination scale; so constructed that two corresponding longitudinal edges of said scale members can be pressed together to coincide while spreading apart the opposite corresponding longitudinal edges of said scale members in a direction substantially perpendicular to said flat outer surface of each scale member.

16. A combination linear scale according to claim 15 in which each said scale member is triangular in cross section with an obtuse angle at the inner vertex of such triangular cross section, and in which said axis substantially coincides with the inner longitudinal edge of each said scale member.

17. A combination linear scale according to claim 15 in which each said scale member has two inclined inner surfaces that intersect along a straight line parallel to said outer surface and substantially equidistant from the longitudinal edges of said outer surface; and in which said axis substantially coincides with the intersection of said inner surfaces of each of said scale members.

18. A combination linear scale according to claim 15 in which each said scale member has a triangular cross section; and which comprises a recess at each end of each said scale member, and a hinge at each end of said combination linear scale fitting into said recess, the axis of each said hinge lying along said single axis between said outer surfaces.

19. A combination linear scale according to claim 15 in which each said scale member has two inclined inner surfaces that intersect along a straight line parallel to said outer surface and substantially equidistant from the longitudinal edges of said outer surface; and which has at least one hinge pivotably connecting each scale member with the other scale member along the intersection of said inner surfaces of each of said scale members.

20. A combination linear scale according to claim 18 in which each said scale member has a recess for each said hinge.

DAVID E. JONES.

References Cited in the file of this patent

FOREIGN PATENTS

| Number | Country | Date |
|--------|---------|------|
| 185,242 | Germany | May 23, 1907 |
| 360,386 | Germany | Oct. 2, 1922 |
| 888,035 | France | Aug. 30, 1943 |